March 19, 1963
T. BOWEN
3,081,638
TIME CONTROL SWITCH MECHANISM
Filed Aug. 3, 1959
3 Sheets-Sheet 1
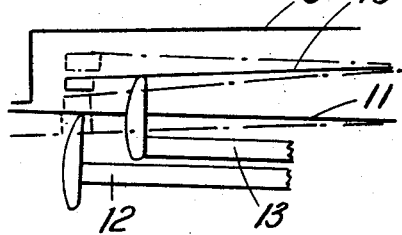
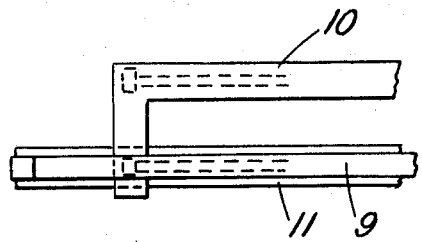
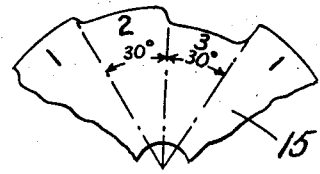
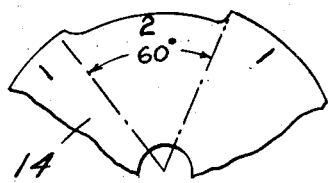
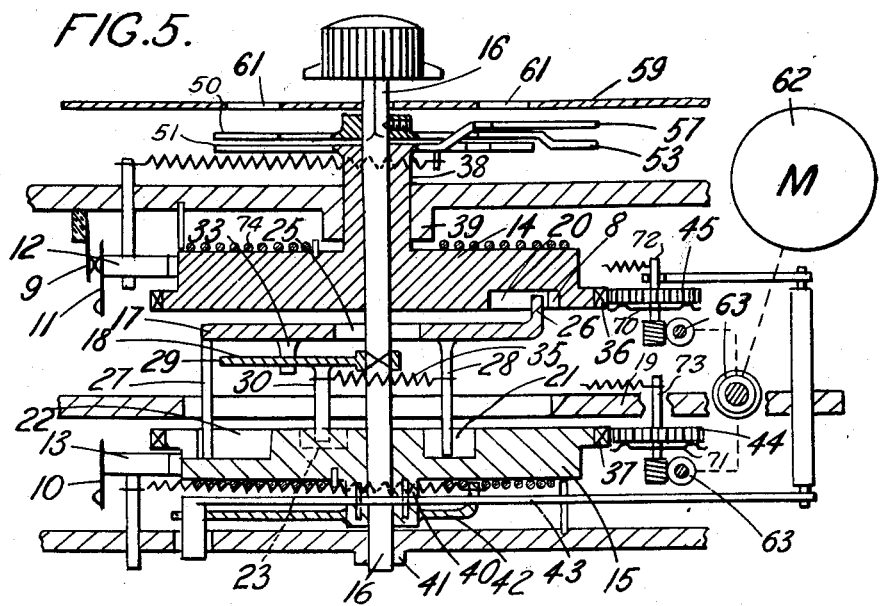
INVENTOR
TOM BOWEN
BY Moore & Hall
HIS ATTORNEYS March 19, 1963 T. BOWEN 3,081,638
TIME CONTROL SWITCH MECHANISM
Filed Aug. 3, 1959 3 Sheets-Sheet 2
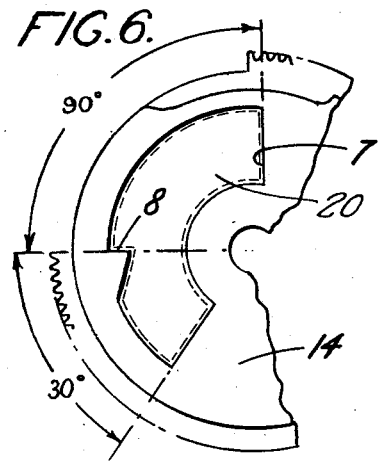
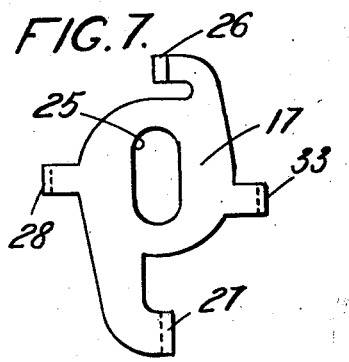
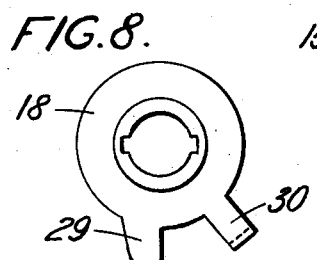
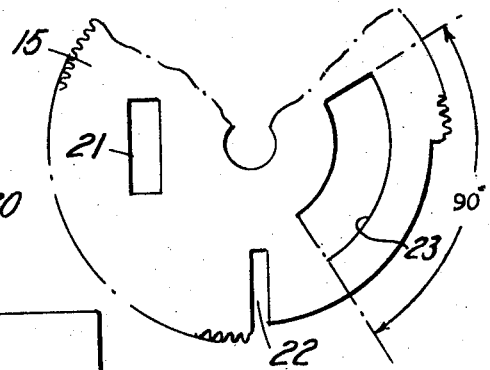
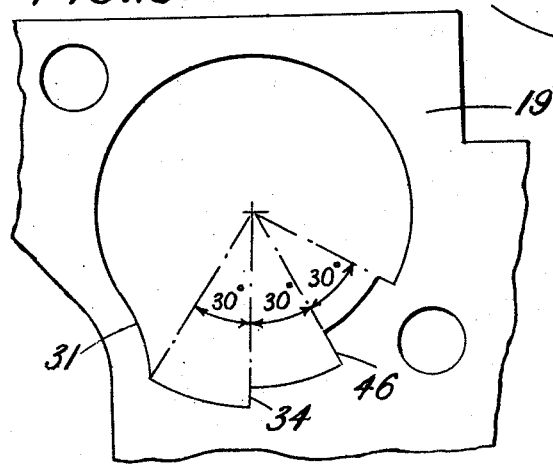
INVENTOR
TOM BOWEN
BY Moore & Hall
HIS ATTORNEYS March 19, 1963 T. BOWEN 3,081,638
TIME CONTROL SWITCH MECHANISM
Filed Aug. 3, 1959 3 Sheets-Sheet 3

INVENTOR
TOM BOWEN
BY Moore & Hall
HIS ATTORNEYS

United States Patent Office 3,081,638
Patented Mar. 19, 1963

3,081,638
TIME CONTROL SWITCH MECHANISM
Tom Bowen, Hove, Sussex, England, assignor, by mesne assignments, to S. Smith & Sons (England) Ltd., London, England, a corporation of England
Filed Aug. 3, 1959, Ser. No. 831,128
Claims priority, application Great Britain Aug. 12, 1958
10 Claims. (Cl. 74—3.5)

This invention relates to time control switch mechanism particularly for electric cookers and has for an object to provide a comparatively simple setting mechanism whereby manipulation of a single setting member may set the mechanism to carry out a number of required conditions.

According to this invention a time control switch mechanism comprises a constant speed motor switch means controlling the motor, switch means for controlling a device to be energised, two toothed racks each engageable with a pinion driven by the motor, spring means urging the racks in the direction which they may be driven by the motor, stop means limiting the extent of movement of the racks under the action of the spring means after the racks have come out of engagement with the driving pinions, a transmission between the two racks and that switch mechanism which is associated with the device to be energised so that movement of one of the racks under the action of its spring means after leaving the driving pinion actuates the switch means to an "on" position and movement of the other rack under the action of its spring means after leaving its rack actuates the switch mechanism to the "off" position, setting means for differentially adjusting the two racks against the action of their springs so that the distances of the points of engagement with the pinions at the ends of the racks are proportional respectively to the times ahead for actuating the switch mechanism to its "on" and "off" positions, a manipulating member arranged both to actuate said setting means and to actuate the other switch mechanism associated with the constant speed motor so that the motor is started as the racks are being differentially set and so that when the knob is released the movement of the racks is under the control of the motor and which motor is switched off when said racks are arrested by said stop means.

Preferably said racks comprise mutilated gear wheels rotatable in a setting direction by the operation of said manipulating member and after setting are rotatable in the other direction first under the control of the motor, and then by the spring means when the pinions enter the mutilated parts of the gears.

The setting means may comprise a setting spindle and said mutilated gear wheels may be arranged coaxially with said spindle, and said setting spindle is connected through a first lost motion connection with that gear wheel which controls the switch "on" position, and the two gear wheels are connected together by a second lost motion connection with which are associated means for rendering the second connection rigid in such a manner that when the setting spindle is first rotated in a setting direction both lost motions are taken up and the gear wheels rotate together during which time said second connection is rendered rigid, whereafter rotation in the opposite direction results in lost motion in the first connection leaving the gear wheel controlling the "off" position stationary whereas the gear wheel controlling the "on" position is brought to a pre-selected position.

The first lost motion connection may comprise an element fixed to the setting spindle and having a finger projecting into an arcuate slot in the gear wheel controlling the switch "on" position, and wherein the second lost motion connection comprises a second element loosely encircling the setting spindle and having one part thereof engaging the gear wheel controlling the switch "on" position and having another part engaging a circumferential slot in the other gear wheel.

In such an arrangement the aforesaid second element may be capable of radial movement with respect to the setting spindle and the first said part thereof engages a radial slot in the gear wheel controlling the switch "off" position and the means for rendering the first lost motion connection rigid comprises a fixed control plate having a cam face engaging a part of the second element, whereby radial movement is imparted to that element bringing a part thereof into the path of movement of a part on the element fixed to the setting spindle.

The means for arresting the movement of the mutilated gears during the switch "on" position after that gear has come under sole control of the spring means comprises a stop on said fixed plate arranged in the path of movement of said second element, whereas the means for arresting the movement of the other wheel comprises the lost motion connection between the two gear wheels.

In any of the arrangements referred to above movement of the aforesaid setting member beyond the position where it sets the gear controlling the switch "off" position is arranged to render the stop means for arresting the mutilated gear inoperative, and permitting further movement of said gear wheels, which further movement under the control of the manipulating member in one direction establishes switch "on" conditions and in the opposite direction establishes switch "off" conditions.

In the case where the time control switch mechanism is arranged for an electric cooker the aforesaid constant speed motor may comprise a synchronous electric motor and said switch mechanism may comprise a number of switch contacts in circuit with said motor, cooker and mains, and wherein said mutilated gear wheels operate cams for controlling movement of two of the contacts.

In one arrangement of switch mechanism a resilient blade connected to the mains carries two spaced contacts, which blade is operated by a cam associated by that gear wheel which controls the switch "off" position, and opposite which contacts are arranged two other contacts one carried on a resilient blade connected to the cooker and operated by the cam associated with the other gear wheel, the other contact is carried by a fixed blade but which can yield and is connected to the synchronous motor.

The following is a more detailed description of time controlled switch mechanism which can be used with an electric cooker reference being made to the accompanying drawings in which:

FIGURE 1 is a diagrammatic side elevation of the switch contacts;

FIGURE 2 is a plan view of the arrangement shown in FIGURE 1;

FIGURE 3 is a face view of part of one of the cams controlling one of the switch blades looking from above;

FIGURE 4 is a similar view of a part of another cam controlling another of the switch blades looking from above;

FIGURE 5 is a diagrammatic cross-section through the cams and cam setting mechanism;

FIGURE 6 is a face view of a part of the cam of FIGURE 4 showing a controlling slot also looking from above;

FIGURE 7 is a face view of a latch piece constituting a part of the setting mechanism;

FIGURE 8 is a face view of a locking piece constituting another part of the setting mechanism;

FIGURE 9 is a face view of the cam looking from above to that of FIGURE 3 and showing various slots formed therein;

FIGURE 10 is a face view of a fixed control plate also constituting a part of the setting mechanism;

Figure 11:
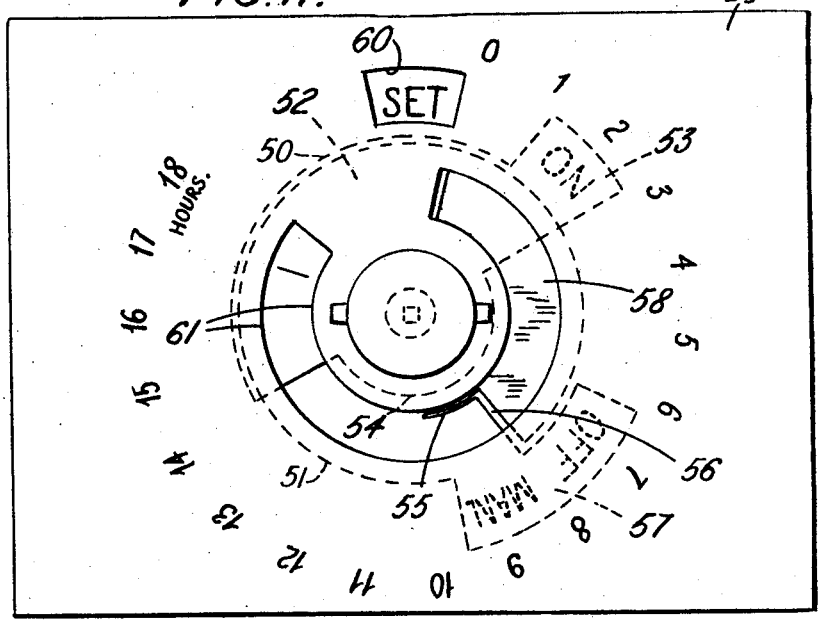
FIGURE 11 is a face view of the indicating mechanism.

As previously indicated the timer comprises switch mechanism which may be set so that a synchronous motor is switched on during the setting and then automatically switches on at a predetermined time ahead at the cooker and finally switches off the cooker after a predetermined lapse of time. The setting mechanism also enables the cooker to be switched on and off by hand. The setting mechanism is also provided with an indicator showing which of the above set of conditions is in operation. The starting time for cooking operations may conveniently be up to eighteen hours ahead, the length of cooking period up to six hours. The indicator may be marked with the following indications: "Set" indicating the timing operation is in progress with the cooker not on; "On" indicating timing operation in progress with the cooker on; "Off" indicating that the cooker is off and that no timing is in progress; and "Manual" that the cooker is on with no time control. There is no indication of time of day so the operator has to decide when setting the number of hours ahead to the finish of cooking. Timing is controlled by a synchronous motor only energised when timing is in progress.

Referring to the arrangement shown in FIGURES 1 and 2 three contact blades 9, 10 and 11 are provided the contact blade 9 being connected to a synchronous motor, the contact blade 10 being connected to the cooker element, and the contact blade 11, being connected to one side of the mains. The motor and cooker element have a common return to the other side of the mains. The contact blade 9 is fixed but can yield to a certain degree. The contact blade 10 is resilient and tends to move to the lower of the two dotted positions shown. Likewise the contact blade 11 is resilient and tends to move to the dotted position. The contact blades 10 and 11 are actuated respectively by tappets 13 and 12. The tappet 13 is actuated by the cam 15 shown in FIGURE 3 hereinafter referred to as the rear cam, and the tappet 12 is operated by the cam 14 shown in FIGURE 4, hereinafter referred to as the front cam. Referring to FIGURES 3 and 9 the greater part of the periphery of the cam 15 is circular and is marked 1 but a recess is cut in the periphery so as to form two sucessive steps, 2 and 3, the angular extent of each of which is 30°.

The periphery of the front cam 14 is also mostly circular but is provided with a recess which is shown in FIGURE 4 as being of 60° angular extent forming one step but is preferably of 65° angular extent. The following table sets out the conditions which prevail when the tappets are on the various parts of the cams. The notation adopted is for example when the rocker 13 is on the main periphery 1 of the rear cam 15 the numeral 1 is referred to.

|     | Rear cam 15 | Front cam 14 | Motor | Cooker | Indicator |
| --- | --- | --- | --- | --- | --- |
| (a) | 1 | 1 | On | Off | Set. |
| (b) | 2 | 1 | On | On | On. |
| (c) | 2 | 2 | Off | Off | Off. |
| (d) | 3 | 2 | Off | On | Manual. |

Referring now to FIGURE 5 it will be seen that the cams 14 and 15 are co-axially arranged and spaced apart. They are provided respectively with fine toothed mutilated gears 36 and 37, the teeth being absent from a 90° sector of each gear. The setting procedure about to be described is capable of rotating both gears and cams in clockwise direction against the action of coiled springs 74, 75 associated with the gears. The gears 36, 37 engage pinions 44 and 45 connected by friction slip clutches 70, 71 which together with the pinions 44 and 45 constitute an overload release construction to separate shafts 72, 73 driven by a synchronous motor 62 through transmissions 63. Thus after the gear wheels and cams have been rotated clockwise by the setting mechanism and are successively released, the rate of return to the initial position, under the action of the springs 74, 75, is controlled by the rate of rotation of the synchronous motor. The friction clutches are so designed as not to slip under the action of said springs. The gear ratios are such that, under these conditions, the gears rotate at the rate of 360° per 24 hours, i.e. 15° per hour. When the pinions reach the cut-away portions of the gear wheels the latter are rapidly rotated by the springs bringing the rockers on to the step portions of the cams. The arrangement is such that the step 2 in the rear cam is first engaged by the rocker 13 and after a predetermined time the rocker 12 engages the step 2 in the front cam 14.

As will be seen from FIGURE 5 the front cam 14 is provided with a hollow boss 38 supported by a bearing 39 in a fixed part of the apparatus, and similarly the rear cam 15 is provided with a boss 40 opposite a bearing 41 which supports a setting spindle 16.

The setting spindle 16 is arranged to extend through the hollow boss of the front cam 14 and has fixed to it, between the two cams, a latch locking-piece 18, the configuration of which is best seen in FIGURE 8 and the details of which are referred to later.

Encircling the spindle 16 is a latch piece 17, the configuration of which is best seen in FIGURE 7 and the details of which are referred to later. The latch piece is disposed between the latch locking piece 18 and front cam 14. A fixed control plate 19 is disposed in a plane between that of the rear cam 15 and the latch locking piece 18 details of which plate are best shown in FIGURE 10. The latch piece 17 is provided with a central elongated slot 25. The setting spindle 16 is a good sliding fit with the sides of the slot. The latch piece 17 is also provided with an upstanding lug 26 permanently lying within an arcuate recess 20 which is from 120°–145° angular extent formed in the cam 14 the outer arcuate wall of which recess is formed with a tooth having a radial face 8 which is indicated in FIGURE 6 as being 30° from the end of the slot but preferably is disposed at 55°. The latch piece 17 is further provided with a down-turned lug 27 at the opposite end of the diameter to the lug 26, which lug 27 passes through an aperture in the control plate 19 and permanently engages the sides of a radial slot 22 in the rear cam 15 as shown in FIGURE 9. The lug 27 may also engage a radial face of a finger 29 formed on the latch locking piece 18 shown in FIGURE 8 and permanently engages the stepped contour of the aperture in the control plate 19. There are also formed on the latch piece 17 two other down-turned lugs 28 and 33 at opposite ends of a diameter at right-angles to the diameter on which the upstanding lug 26 and down-turned lug 27 are disposed. The down-turned lug 28 on the latch piece 17 passes clear of the locking piece 18 through the aperture in the control plate 19 and extends into a slot 21 formed in the rear cam 15.

As previously indicated the latch locking piece 18 is fixed to the spindle 16 and is provided with the aforesaid finger 29 and with an axially extending lug 30 which projects into a 90° arcuate slot 23 cut in the cam 15. Also the lug 30 on the latch locking piece 18 is connected by a tension spring 35 to the down-turned lug 28 on the latch piece 17, the spring 35 urging latch piece 17 downwards in the position of FIGURE 5 and maintaining the lug 27 in engagement with the stepped contour of the aperture in the control plate 19. The above described integers provide for the following conditions.

(i) A rigid connection during setting between the setting spindle 16 and rear cam 15 from a "pick up" point i.e. at a point just prior to that at which the rear cam gear 15 engages its associated pinion when the rear cam gear, and setting spindle, are rotated in the setting direction, i.e. clockwise as shown in the drawings.

(ii) A lost motion connection through the latch piece 17 between the front and rear cams limited to 90° (by tooth 8) when the rear cam is positioned clockwise beyond the pick up point, but which permits a further 30° to 55° of movement of the rear cam counter-clockwise relative to the front cam when the rear cam is positioned counter-clockwise beyond the pick up point.

(iii) Stops on the control plate 19 for limiting movements of the front and rear cams under the action of their springs.

(iv) Means to enable the rear cam to be brought to the "Manual On" position, by manipulation of the setting spindle. Additionally a lobed plate 42 rigid with the rear cam actuates a conventional pawl 43 to lift the pinion 45 out of engagement with the front cam gear 36 as the setting spindle 16 is operated to switch to "Manual On."

The mode of operation is as follows:

(1) It is assumed that switches are in a position in which both the motor and the cooker are cut off, i.e. the position *c* of the above mentioned table. The various parts of the mechanism are shown approximately in their relative positions in this state in FIGURES 6 to 10, whereas in FIGURE 5 the various parts have been turned round through different angles and modified in certain respects for ease of illustration.

(2) The upper end 7 of the cut-out 20 in the front cam 14 FIGURE 6 engages the upstanding lug 26 on the latch piece 17 FIGURE 7.

(3) The steps 2—2 of the two cams are engaged by their respective rockers 12, 13.

(4) The setting spindle is in the top of the slot 25 in the latch piece 17 (FIGURE 7).

(5) The pinions 44 and 45 are in the cut-away portions of the gear wheels 37, 36.

The setting of the mechanism is carried out from the above position as follows:

The setting spindle 16 is rotated clockwise. The down-turned lug 30 on the latch locking piece 18 engages the left or bottom hand end of the arcuate slot 23 (FIGURE 9) in the rear cam 15, and rotates that cam clockwise. The rear cam 15 rotates the latch piece 17 by reason of the down-turned lug 27 being in engagement with the radial slot 22 in the rear cam. The latch piece 17 rotates the front cam 14 clockwise by reason of the engagement of the upstanding lug 26 on the latch piece engaging with the end 7 of the cut-out 20 in the front cam 14. Thus both cams are rotated against the action of their springs 74, 75. The fine pitch gear teeth on the cams will eventually come into engagement with the pinions 44, 45 geared to the motor, and the pinions are so mounted that they ratchet or jump out of engagement during this direction of rotation and thus constitute overload release devices.

The down-turned lug 27 on the latch piece 17 rides along the convexly curved portion 31 of the fixed control plate under the action of the spring 35 resulting in inward radial movement being imparted to the latch piece 17 thereby bringing the down-turned lug 27 opposite the radial face of the finger 29 on the latch locking piece 18.

Thus a rigid or two way connection is established between the setting spindle 16 and the rear cam so long as the down-turned lug 27 on the latch piece 17 engages the contour of the fixed control plate 19 clockwise beyond the convexly curved portion 31.

Rotation of the setting spindle is continued clockwise until the front cam 14 is in position corresponding to the desired finish time when the followers 12 and 13 will be on the portions 1 of their cams and the motor will have been started as in line *a* of the above table.

The setting spindle 16 is then rotated counter-clockwise, causing upturned lug 26 also to move counter-clockwise away from the end 7 of the slot 20 in cam 14 thus providing lost motion between the setting spindle 16 and the cam 14. The rear cam 15 is rotated counter-clockwise by the engagement of lug 27 on latch piece 17 in slot 22 in rear cam 15. The cam 15 is thus brought to a position corresponding to the desired start time. During this counter-clockwise setting of cam 15 the clutch 71 slips and thus permits the adjustment. If an inadvertent attempt is made to set the start time more than six hours prior to finish time, the upstanding lug 26 on the latch piece 17 engages the radial face of the tooth 8 of the front cam 14 and drags it back again. The cams are still in the condition set out under *a* of the above table. The front and rear cams 14 and 15 are urged counter-clockwise under the action of their associated springs and rotate at a rate determined by the motor driven pinions 44, 45 engaging the mutilated gears 37, 36 i.e. 15° per hour.

As the "on" time approaches the downwardly turned lug 27 on the latch piece 17 rides counter-clockwise around the convex surface 31 on the apertured portion of the fixed plate 19 whereby the latch piece 17 is moved bodily radially outwards with respect to the setting spindle by means of a spring 35 connected between the down-turned lug 27 and the lug 30 and brings the lug 27 clear of the finger 29 also the path of movement of the upstanding lug 26 is simultaneously moved radially inwards clear of the tooth 8. Upon the "on" time being reached the mutilated gear on the rear cam 15 runs off its pinion, the rear cam rotates counter-clockwise quickly under the action of its spring for about 30° to a position in which the down-turned lug 27 on the latch piece 17 engages the radial face 34 of the fixed control plate 19. The latch locking piece 18 and setting spindle rotate counter-clockwise similarly by reason of the engagement between down-turned lug 30 and the end of slot 23.

If a full six hours cooking period has been set the upstanding lug 26 on the latch piece 17 will just prior to the above mentioned rapid counter-clockwise movement be near the radial face of the tooth 8 i.e. the withdrawal action provides a requisite 30° to 55° motion beyond the tooth for switch operation in this position.

The cams are then in the position set out in line *b* of the above table i.e. the motor is running and the cooker is on.

When "off" time is reached the mutilated gear on the front cam 14 runs off the pinion under the action of its spring and is moved 30° counter-clockwise till the top end 7 of the cut out 20 in the front cam 14 again engages the upstanding lug 26 on the latch piece 17. The cams are then in a position as set out in line *c* of the above table i.e. motor and cooker both off.

Assuming that the switching mechanism is required to be under manual control only when the parts are in the position *c* last described above the setting spindle 16 is rotated counter-clockwise from this position. The downwardly turned lug 30 on latch locking piece 18 engages the downwardly turned lug 33 on the latch piece 17 and since the abutting faces of the lugs 30, 33 are angularly displaced from the lug 27 there will be a radial component of force lifting the downwardly turned lug 27 until it clears the radial face of the stop 34 on the fixed plate 19. The cams are then rotated counter-clockwise through a further 30° under the influence of their springs until the down-turned lug 27 engages the radial face 46 on the fixed plate 19.

The cams are then in the position defined by line *d* of the above table i.e. the cooker is on and the motor off.

As indicated above a lobed plate 42 is rigidly connected to the cam 15 and a lobe on the plate is arranged to engage the pawl 43 when the setting spindle, and hence the cam 15, are turned counter-clockwise beyond the manual position and lifts the pinion 45 associated with the front cam 14 out of engagement with its gear track as the cam is rotated counter-clockwise from the off position.

Thus, if the front cam 14 is not in the position with the end 7 of the cut out 20 engaging the upstanding lug 26 when an operator commences to set the manual "on" condition, it will be released so that it reaches that position under the influence of its spring. This would occur if the operator required to bring the cooker under manual control before it had been switched off under automatic control.

An indicating device suitable for a cooker as shown in FIGURES 5 and 11 is provided encircling the mechanism to be set to close the contacts at a predetermined time and to be maintained closed for a predetermined time and also to indicate when the cooker is on or off and when it is under manual control which indicating device is constructed as follows.

Two disc-like indicating members 50, 51 are provided the former being fixed to the setting spindle and the latter to the front cam 14. The indicating member 50 comprises sector portion 52 of 180° angular extent and a smaller sector portion 54 joining it also of 180° angular extent. A tab 53 projects from the larger diameter sector portion at one end thereof and is of about 30° angular extent and which tab is marked with "On" and is bent into the general plane of the indicating member 51.

The disc-like indicating member 51 is formed with a radial slit 56 and is provided with an arcuate extension 57 projecting beyond the main circumference of the disc to an equal extent on either side of the radial slit. This extension has an angular extent of 60° and is marked "Off Man" and bent up into the general plane of the disc-like indicating member 50. A part of the indicating member 51 to one side of the radial slit is coloured so as to be distinct from the other parts of the indicating mechanism and the angular extent of the distinctively coloured portion corresponds to the maximum cooking period which may be required.

A masking plate 59 is provided with a scale graduated in hours and is provided with a window 60 disposed in the path of travel of the parts marked "On" and "Off Man" and when the window is not obscured by those parts it is opposite a fixed part of the frame of the mechanism marked "Set." The masking plate is also provided with an arcuate slot 61 which extends from a position opposite the right hand edge of the window 60 to an angular extent representing the maximum time ahead required for setting the apparatus i.e. about 270°.

In operating the setting mechanism, the setting spindle is turned clockwise when "Set" appears in the window 60 and clockwise rotation of the setting spindle is continued until the radial slit 56 is aligned with the desired time on the scale corresponding to the time for finish of the cooking operation. The setting spindle is then turned counter-clockwise until the radial edge of the tab where the two sector portions join one another is opposite the desired time of commencement of the cooking operation.

A certain length of the distinctively coloured part 58 then appears in the slot representing the duration of the cooking time. As the clockwork motor starts the two setting members rotate together until the last mentioned edge of the tab 53 becomes aligned with the end of the arcuate slot when "On" appears in the window. Continued rotation of the motor will bring the edge 56 of the distinctively coloured portion to the end of the slot, the pinion then runs off the finish cam and "Off" appears in the window. If the setting spindle is then moved to its further counter-clockwise position by hand the word "Man" appears in the window.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A time controlled actuating mechanism comprising a constant speed motor an adjustable cam mechanism driven by the motor and operating the actuating mechanism at predetermined times, which adjustable cam mechanism comprises two cams driven by the motor through a shaft and through two transmissions respectively, overload release devices in said transmissions permitting angular adjustment of the cams relatively to one another and to said shaft a single setting spindle mounted for rotation to apply setting movement to the two cams, lost motion devices and associated coupling latches connecting said single setting spindle and said two cams, respectively, whereby the cams may be moved from datum positions to different extents corresponding to the times when the actuating switch mechanism is to be actuated, a spring for each cam mounted to exert a force upon its respective cam and adapted to rotate it in the same direction as said motor, each said spring being wound up by rotatably setting the respective cam in one direction, said transmissions each embodying interrupted gearing permitting the cams to be rapidly rotated by their springs when the interruptions are reached, stop means for arresting the rotation of the cams under the action of their springs and cam followers actuated by the cams for operating the actuating mechanism.

2. A time control actuating mechanism according to claim 1 wherein said transmission for driving a cam comprises a mutilated gear wheel rotatable in a setting direction by the operation of said setting spindle and a pinion driven by the motor, engaging the gear wheel and each of said cams, and after setting is rotatable in the other direction first under the control of the said motor, and then by the spring when the pinions enter the mutilated part of the gear wheel.

3. A time controlled actuating mechanism according to claim 1 wherein said lost motion devices and coupling latches comprise a latch locking piece fixed to the setting spindle, a latch piece, a lug on the latch locking piece projecting into an arcuate slot in one of the cams and constituting one lost motion connection, a direct connection between the cam and said latch piece, a projection on said latch piece projecting into an arcuate slot in the other said cam and constituting another lost motion connection and means controlled by said latch piece which, upon rotation of the latch piece, couples and uncouples (according to the direction of rotation) the latch piece and the first mentioned cam to and from the setting spindle and said latch locking piece.

4. A time controlled actuating mechanism according to claim 1 wherein said lost motion devices and coupling latches comprise a latch locking piece having a radial face fixed to the setting spindle, a latch piece, a lug on the latch locking piece projecting into an arcuate slot in one of the cams and constituting one lost motion connection, a direct connection between the cam and said latch piece, a projection on the latch piece projecting into an arcuate slot in the other said cam and constituting another lost motion connection and means controlled by said latch piece which, upon rotation of the latch piece couples and uncouples (according to the direction of rotation) the latch piece and the first mentioned cam to and from the setting spindle and said latch locking piece said latch piece being mounted in said mechanism so as to be radially movable with respect to the spindle and having a part thereof engageable with a radial slot in the first mentioned cam constituting the aforesaid direct connection, a fixed control plate having a cam face, said part of the latch piece engaging said face whereby rotation of the latch piece causes radial movement to be imparted to it bringing said part thereof opposite said radial face of the locking piece.

5. A time controlled actuating mechanism according to claim 1 wherein said lost motion devices and coupling latches comprise a latch locking piece having a radial face and fixed to the setting spindle, a latch piece, a fixed control plate having a cam face, a lug on the latch locking piece projecting into an arcuate slot in one of the cams and constituting one lost motion connection, a direct connection between one of said cams and said latch piece, a lug on the latch piece projecting into an arcuate slot in the other said cam and constituting another lost motion connection and means controlled by said latch means which, upon rotation of the latch piece couples and uncouples (according to the direction of rotation) the latch piece and the first mentioned cam to and from the setting spindle and the latch locking piece, said latch piece being mounted in said mechanism so as to be radially movable with respect to the spindle and having a part thereof engageable with a radial slot in the first mentioned cam which two parts constitute the aforesaid direct connection, said part of the latch piece being arranged to engage said face on said fixed control plate whereby rotation of the latch piece causes radial movement to be imparted to it bringing said part thereof opposite said radial face of the latch locking piece said interrupted gearing comprising mutilated gear wheels, said stop means for arresting the movement of one of the cams under the control of its spring comprising a stop on said fixed plate arranged in the path of movement of said part of the latch piece and said stop means for arresting the movement of the other cam comprising said second lost motion connection providing lost motion between the two gear wheels.

6. A time controlled actuating mechanism according to claim 1 wherein said lost motion devices and coupling latches comprise a latch locking piece having first and second radial faces and fixed to the setting spindle, a latch piece, a fixed control plate having a cam face, a lug on the latch locking piece projecting into an arcuate slot in one of the cams and constituting one lost motion connection, a direct connection between one of said cams and said latch piece, a lug on the latch piece projecting into an arcuate slot in the other said cam and constituting another lost motion connection and means controlled by said latch piece which, upon rotation of the latch piece couples and uncouples (according to the direction of rotation) the latch piece and the first-mentioned cam to and from the setting spindle and the latch locking piece, said latch piece being mounted in said mechanism so as to be radially movable with respect to the spindle and having a part thereof engageable with a radial slot in the first mentioned cam which two parts constituting the aforesaid direct connection, said part of the latch piece being arranged to engage said cam face on said fixed control plate whereby rotation of the latch piece causes radial movement to be imparted to it bringing said part thereof opposite said first radial face of the latch locking piece, said interrupted gearing comprising mutilated gear wheels on said cams, said stop means for arresting the movement of one of the mutilated gear wheels under the control of its spring comprising a stop on said fixed plate arranged in the path of movement of said part of the latch piece and the means for arresting the movement of the other cam comprising said second lost motion connection providing lost motion between the two gear wheels and wherein the movement of the aforesaid setting spindle beyond the position where it sets the cam controlling the second movement of the actuating mechanism is arranged to impart further radial movement to the latch piece bringing it clear of said first face and permitting further movement of said cams until the latch piece engages said second radial face which further movement under the control of the setting spindle operates the actuating mechanism directly.

7. A time and hand controlled actuating mechanism comprising an "off" cam and an "on" cam respectively shaped to operate the actuating mechanism in an "off" and "on" sense, a clock train connected to transmit movement to both cams in one direction, a single setting member, a transmission connected in operative relative between the setting member and the two cams to transmit movement of the setting member simultaneously to the two cams to move them away from a datum position in the opposite diretcion to that imparted to them by the clock train and also connected to transmit movement to the "on" cam only in the same direction imparted to it by the clock train whereby it reaches the datum position sooner than the "off" cam, said cams in moving to the datum position operate the actuating mechanism successively and said setting member in moving away from the datum position in the direction of movement of the clock train conditions at least the "on" cam to move in that direction whereby the actuating mechanism is operated in the "on" sense whereas reversal of movement of the setting member actuates it in the "off" sense.

8. A time and hand controlled actuating mechanism, comprising "on" and "off" cams respectively shaped to operate the actuating mechanism in an "on" and "off" sense, a clock train connected to transmit movement to both cams in one direction, a single setting member, a lost motion connection between the setting members and the "off" cam, a transmission connected between the setting member and the "on" cam to drive it in both directions, said lost motion connection and transmission cooperating when the setting member is rotated from a datum position in one direction to move both cams in the opposite direction to that in which they are moved by the clock train, and reverse movement of the setting member after moving both cams causes lost motion between the setting member and the "off" cam leaving that cam in its set position whilst reverse movement is transmitted to the "on" cam until it is set in the required position, whereafter said clock train returns both cams successively to the datum position resulting in the actuating mechanism being operated successively in the "on" and "off" senses, whereas should the setting member be moved by hand from the datum position in the opposite direction to that in which it was first moved it conditions the "on" cam to move in the said opposite direction thereby operating the actuating mechanism whereas reversal of the movement of the setting member operates the actuating mechanism in the "off" sense.

9. A time and hand controlled actuating mechanism according to claim 7, spring means mounted to resist the movement of the cams away from the datum position and in cooperation with the clock train control the return movement of the cams to the datum position, stop means carried by the mechanism to locate the cams in the datum position against the action of the spring means and wherein movement of the setting member away from the datum position in the opposite direction to which it was first moved releases the stop means whereby the cams are moved further by the spring means and operate the actuating mechanism in the "on" sense.

10. A time and hand controlled mechanism for actuating a device from an off condition to an on condition, comprising, a constant speed motor, a mechanism driven by said motor and embodying two relatively settable members the set positions of which determine respectively the on and off times when the device is to be actuated, a single setting member mounted for clockwise and counter-clockwise rotation, a transmission between the setting member and the settable members constructed, when the setting member is moved from a datum position in one direction, to move both members to a position determining the off time and which when moved in the opposite direction from that position leaves one of the members behind and moves the other to a position determining the on time, whereas movement of said single setting member on the opposite side of the datum position controls directly the on and off position of the device independently of the constant speed motor.

References Cited in the file of this patent

UNITED STATES PATENTS

| | | |
|---|---|---|
| 2,158,160 | Thiem | May 16, 1939 |
| 2,585,018 | Kreitchman et al. | Feb. 12, 1952 |
| 2,603,287 | Midgley | July 15, 1952 |
| 2,689,005 | Schroeder | Sept. 14, 1954 |
| 2,723,335 | Hotchkin | Nov. 8, 1955 |
| 2,854,855 | Dudley | Oct. 7, 1958 |
| 2,905,778 | Fox et al. | Sept. 22, 1959 |